US008129452B2

(12) United States Patent
Blanc-Magnard et al.

(10) Patent No.: US 8,129,452 B2
(45) Date of Patent: Mar. 6, 2012

(54) USE OF A SPECIFIC PLATINUM COMPOUND IN ORDER TO IMPROVE THE RESISTANCE OF SILICON ELASTOMERS TO DEGREDATION CAUSED BY VERY HIGH TEMPERATURES

(75) Inventors: Delphine Blanc-Magnard, Lyons (FR); Alain Pouchelon, Meyzieu (FR); Sebastien Sterin, Lyons (FR); Rémi Thiria, Lyons (FR)

(73) Assignee: Rhodia Chimie, Aubervilliers (FR)

( * ) Notice: Subject to any disclaimer, the term of this patent is extended or adjusted under 35 U.S.C. 154(b) by 672 days.

(21) Appl. No.: 11/817,645

(22) PCT Filed: Feb. 22, 2006

(86) PCT No.: PCT/FR2006/000396
§ 371 (c)(1),
(2), (4) Date: Mar. 4, 2009

(87) PCT Pub. No.: WO2006/095068
PCT Pub. Date: Sep. 14, 2006

(65) Prior Publication Data
US 2009/0264563 A1  Oct. 22, 2009

(30) Foreign Application Priority Data

Mar. 4, 2005  (FR) ..................... 05 02180

(51) Int. Cl.
C08K 5/35 (2006.01)
C08K 5/3445 (2006.01)
C08K 5/04 (2006.01)
C07F 15/00 (2006.01)
C08L 83/04 (2006.01)
C09K 3/00 (2006.01)

(52) U.S. Cl. .............. 524/106; 524/83; 524/84; 524/85; 524/95; 524/96; 524/97; 524/98; 524/99; 524/394; 524/442; 524/506; 524/588; 252/182.14; 548/101

(58) Field of Classification Search ................... 524/106, 524/394, 506, 588, 83, 84, 85, 95, 96, 97, 524/98, 99, 442; 252/182.14; 548/101
See application file for complete search history.

(56) References Cited

U.S. PATENT DOCUMENTS

| 4,777,087 | A | 10/1988 | Heeks et al. |
| 6,323,253 | B1 | 11/2001 | Bennington |
| 6,387,518 | B1 | 5/2002 | Wolfer et al. |
| 7,202,320 | B2 * | 4/2007 | George et al. ................... 528/14 |
| 2004/0236054 | A1 * | 11/2004 | George et al. ................... 528/15 |

FOREIGN PATENT DOCUMENTS

WO  WO 02/098971  12/2002

OTHER PUBLICATIONS

International Search Report dated May 31, 2007.

* cited by examiner

*Primary Examiner* — Kriellion Sanders
(74) *Attorney, Agent, or Firm* — Baker Donelson Bearman, Caldwell & Berkowitz, PC

(57) ABSTRACT

This invention is directed to stabilizing additives that contain at least one platinum complex, with the complex including a carbene group. The stabilizing additives make it possible to improve the resistance to decomposition of silicone elastomers under high temperatures. The additive can be used in a polyorganosiloxane composition intended for the production of a silicone elastomer with either crosslinks at high temperature under the action of organic peroxides or crosslinks at ambient temperature or with heat by polyaddition reactions in the presence of a metal catalyst.

14 Claims, No Drawings

USE OF A SPECIFIC PLATINUM COMPOUND IN ORDER TO IMPROVE THE RESISTANCE OF SILICON ELASTOMERS TO DEGREDATION CAUSED BY VERY HIGH TEMPERATURES

CROSS REFERENCE TO RELATED APPLICATIONS

The present application is a 35 U.S.C. §371 National Stage Application of International Application No. PCT/FR2006/000396, having an international filing date of Feb. 22, 2006 and claiming priority to FR 0502180 filed Mar. 4, 2005, the entire contents of which are hereby incorporated by reference.

BACKGROUND OF THE INVENTION

1. Field of the Invention

A subject matter of the present invention is the use, as stabilizing additives which make it possible to improve the resistance to decomposition of silicone elastomers under the effect of very high temperatures:
of at least one specific platinum compound,
in a polyorganosiloxane composition intended for the production of a silicone elastomer which either crosslinks at high temperature under the action of organic peroxides (composition referred to as HCR or HCE) or crosslinks at ambient temperature or with heat by polyaddition reactions in the presence of a metal catalyst (composition referred to as RTV, LSR or polyaddition HCE).

2. Description of Related Art

The expressions RTV, LSR and HCE are well known to a person skilled in the art: RTV is the abbreviation for "Room Temperature Vulcanizing", LSR is the abbreviation for "Liquid Silicone Rubber", HCR is the abbreviation for "Heat Cured Rubber" and HCE is the abbreviation for "Heat-Curable Elastomer".

In the field of electrical engineering, the polyorganosiloxane compositions referred to above can be used, for example, for the production of the primary jackets or insulations used in forming fire-resistant electrical wires or cables.

The expression "fire-resistant electrical wires or cables" is intended to define electrical wires or cables which have to guarantee fire behavior of high quality in terms, at least, of ash cohesion and of smoke density. The characteristics which fire-resistant electrical wires or cables have to exhibit form the subject of legal regulations in numerous countries and strict standards have been drawn up.

In France, for example, an important standard relating to fire resistance tests on electrical cables which it is advisable to meet is the standard NF C 32-070 CR1, which relates to the duration of operation of cables burning under defined conditions. The fire resistance is at least partly to be attributed to the production of ash, which has to exhibit a degree of cohesion making it possible to retain sufficient insulation for the operation of the cables. In this test, each cable sample is positioned in a metal tube which itself is subsequently placed in a furnace, the temperature of which reaches 920° C. over 50 minutes and is subsequently maintained at this value for 15 minutes; during this test, the cable sample is subjected to regular impacts (via an impact bar which beats against the metal tube at the rate of two blows per minute); the test is successful if control lamps, connected to the cable supplied with a nominal voltage, have not gone out at the end of the duration of the test (that is to say, after 65 minutes); the standard is met if at least 80% by number of the tests carried out are successful.

An electrical cable is composed, according to the known prior art, of one or more monoconductor(s) (generally based on Cu or on Al); each of these monoconductors is protected by a primary jacket or insulation made of one or more concentric layer(s) based on silicone elastomer. One or more filling element(s) and/or one or more reinforcing element(s) based in particular on glass fibers and/or on mineral fibers is (are) provided around this jacket or these jackets (in the case of a cable comprising several monoconductors). The cable then receives the external sheathing, which may comprise one or more sheath(s).

In the case of an electrical cable comprising several monoconductors, the filling element(s) and/or the reinforcing element(s) which is (are) positioned around the monoconductors (each equipped with its primary insulation) constitute(s) a jacket common to the combined monoconductors. Although the silicone elastomer used in forming the cables is essentially the constituent material of the primary insulation(s), it can also be present, in variable proportions: in the filling element(s) and/or in the reinforcing element(s) (constituting the common jacket in the case of a cable comprising several monoconductors); and/or in the external sheath(s).

In the field of electrical engineering, the polyorganosiloxane compositions referred to above can also be used, for example, in any application in which it is possible to employ polyorganosiloxane elastomers which are not only combustible with difficulty but which are also resistant to leakage currents and the electric arc; they can be used in particular to produce electrical insulation materials, medium-voltage and high-voltage insulators, cable termination accessories, cable joints, anode caps for television tubes and molded objects or extruded articles for the aeronautics industry.

In this context, another important standard relating to fire resistance tests which it is also advisable to meet is the international standard IEC 60587 (IEC is the abbreviation for the expression: International Electrotechnical Commission), which relates to the determination of the tracking resistance indices of solid insulating materials subjected to severe temperature conditions; the tracking resistance index, in combination with the determination of the value of the erosion, when this is requested, is used as criterion for acceptance and as criterion for control of the quality of the materials manufactured.

Platinum is a stabilizing additive known for its positive effect with regard to the decomposition of silicone elastomers.

It is known, from JP-A-76/035 501, to use a mixture of platinum and of a mixed iron oxide of formula $(FeO)_x \cdot (Fe_2O_3)_y$, where the ratio x/y is between 0.05/1 and 1/1, to improve the flame resistance properties of silicone elastomers obtained from HCE compositions.

It is known, from FR-A-2 166 313 and EP-A-0 347 349, to use a mixture of platinum with at least one rare earth metal oxide, in particular a mixture of platinum with cerium(IV) oxide $CeO_2$, to improve the flame resistance properties of silicone elastomers obtained from HCE compositions (FR-A-2 166 313) or RTV compositions (EP-A-0 347 349).

It is also known, from EP-A-0 951 503, that the use of mixtures based on platinum and on compounds of transition metals other than platinum also makes it possible to improve the tracking and arc resistance properties of silicone elastomers.

The platinum with which this prior art is concerned can in particular be:

in the form of platinum metal (elemental), or in the following forms:

chloroplatinic acid $H_2PtCl_6.6H_2O$ (as described in U.S. Pat. No. 2,823,218), anhydrous chloroplatinic acid, $PtCl_2 [P(CH_2—CH_2—CH_3)_3]_2$, complexes, such as those of formula $(PtCl_2.olefin)_2$ described in U.S. Pat. No. 3,159,601, the olefin of the complex representing in particular ethylene, propylene, butylene, cyclohexene or styrene, $(PtCl_2.C_3H_6)_2$, complex of platinum chloride and of cyclopropane described in U.S. Pat. No. 3,159,662, complexes of platinum and of vinylated organopolysiloxanes, such as, for example, the Karstedt catalyst (cf. U.S. Pat. No. 3,775,452).

Anhydrous chloroplatinic acid and the Karstedt catalyst are examples of platinum stabilizers which are particularly appropriate.

SUMMARY OF THE INVENTION

The applicant company has now found, and it is this which constitutes the subject matter of the present invention, that the decomposition of silicone elastomers resulting from polyorganosiloxane compositions of RTV, LSR, polyaddition HCE or HCE type is indeed reduced if use is made, as stabilizing additive, of at least one specific platinum compound corresponding to the definition which will be given in the continuation of the present statement.

More specifically, the present invention thus relates to the use, as stabilizing additives which make it possible to improve the resistance to decomposition of silicone elastomers under the effect of very high temperatures:

of platinum, in a polyorganosiloxane composition C intended for the production of a silicone elastomer which either crosslinks at high temperature under the action of organic peroxides or crosslinks at ambient temperature or with heat by polyaddition reactions in the presence of a metal catalyst, said use being characterized in that the platinum is in the form of at least one compound chosen from the group consisting of:

a) at least one platinum complex selected from the products of formula (I):

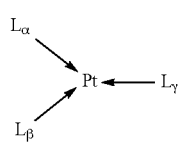

(I)

in which:

$L_\gamma$ represents a carbene of formula (II):

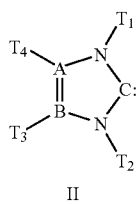

(II)

in which:

A and B independently represent C or N, it being understood that, when A represents N, then $T_4$ does not represent anything and, when B represents N, then $T_3$ does not represent anything;

$T_3$ and $T_4$ independently represent a hydrogen atom; an alkyl group; a cycloalkyl group optionally substituted by alkyl or alkoxy; an aryl group optionally substituted by alkyl or alkoxy; an alkenyl group; an alkynyl group; or an arylalkyl group in which the aryl part is optionally substituted by alkyl or alkoxy; or else $T_3$ and $T_4$ can form, together and with A and B when the latter each represent a carbon atom, an aryl;

$T_1$ and $T_2$ independently represent an alkyl group; an alkyl group optionally substituted by alkyl; a perfluorinated alkyl group or an alkyl group optionally substituted by a perfluoroalkyl group; a cycloalkyl group optionally substituted by alkyl or alkoxy; an aryl group optionally substituted by alkyl or alkoxy; an alkenyl group; an alkynyl group; or an arylalkyl group in which the aryl part is optionally substituted by alkyl or alkoxy; or else $T_1$ and $T_2$ independently represent a monovalent radical of following formula (V):

$$V_1—V_2 \quad (V)$$

in which:

$V_1$ is a divalent hydrocarbon radical, preferably an alkylene, $V_2$ is a monovalent radical chosen from the group of the following substituents:

alkoxy, $—OR^o$ with $R^o$ corresponding to alkyl or aryl, amine, preferably $N(R^o)_2$ with $R^o$ corresponding to hydrogen, alkyl or aryl, $T_1$ and $T_2$ independently represent a monovalent radical of following formula (W):

$$W_1\text{-}\omega\text{-}W_2 \quad (W)$$

in which:

$W_1$ is a divalent hydrocarbon radical, preferably a linear or branched $C_1$-$C_{10}$ alkylene, which is optionally substituted, ω represents:

$—R^1C=CR^1—$ with $R^1$ corresponding to H or alkyl or $—C\equiv C—$ $W_2$ is a monovalent radical chosen from the group of the following substituents:

♣$R^2$=alkyl or H;

♣Si-alkyl or Si-alkoxy, preferably $—Si(R^3)_3$ with R³=alkyl;
♣ketone, preferably:

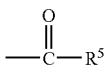

with R⁵=alkyl;
♣carboxyl, preferably

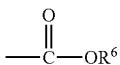

with R⁶=alkyl;
♣amide, preferably

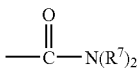

with R⁷=H or alkyl;
♣acyl, preferably

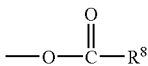

with R⁸=alkyl;
or again the substituents $T_1$, $T_2$, $T_3$ and $T_4$ can form, in pairs, when they are situated on two adjacent ring members in the formula (II), a saturated or unsaturated hydrocarbon chain;
$L_\alpha$ and $L_\beta$ are ligands which are identical to or different from one another and each represent:

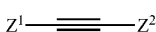

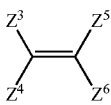

with, in these formulae (III.1) and (III.2):
$Z^1$, $Z^2$, $Z^3$, $Z^4$, $Z^5$ and $Z^6$
each independently representing:
a. hydrogen,
b. a halogen,
c. a cyano,
d. a saturated or unsaturated electron—withdrawing hydrocarbon group, preferably adjacent to the double or triple bond,
e. it being possible for two vicinal $Z^1$ to $Z^6$ together to form an electron—withdrawing ring advantageously different from the carbene $L_\gamma$ of formula (II) and optionally comprising heteroatoms (preferably O, N or S);
or the substituents $Z^1$ and $Z^2$ together form, in (III.1), a monovalent alkenyl radical comprising at least one electron-withdrawing residue preferably adjacent to the triple bond;

or again $Z^3$ to $Z^6$ form, in pairs, in (III.2), a monovalent alkenyl radical comprising at least one electron—withdrawing residue preferably adjacent to the double bond;
or together form the ligand $L_\delta$ of formula (IV):

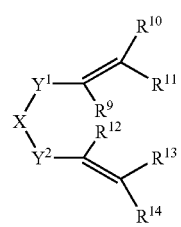

in which:
$Y^1$ and $Y^2$ represent, independently of one another, $CR_aR_b$ or $SiR_cR_d$;
X represents O, $NR_e$ or $CR_fR_g$;
$R^{10}$, $R^{11}$, $R^{13}$ and $R^{14}$, which are identical or different, are chosen from a hydrogen atom, an alkyl group or an aryl group optionally substituted by alkyl;
$R^9$, $R^{12}$, $R_a$, $R_b$ and $R_e$ are chosen independently from a hydrogen atom; an alkyl group; an acyl group; an aryl group optionally substituted by alkyl; a cycloalkyl group optionally substituted by alkyl; and an arylalkyl group in which the aryl part is optionally substituted by alkyl;
$R_c$ and $R_d$ are chosen independently from alkyl; aryl optionally substituted by alkyl; cycloalkyl optionally substituted by alkyl; and arylalkyl in which the aryl part is optionally substituted by alkyl; or else
when $Y^1$ and $Y^2$ independently represent $SiR_cR_d$, two $R_c$ groups bonded to two separate silicon atoms together form a chain of formula:

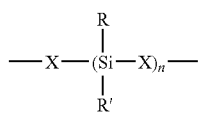

in which n is an integer from 1 to 5; X is as defined above; R and R', which are identical or different, take any one of the meanings given above for $R_c$ or $R_d$;
or else
when $Y^1$ and $Y^2$ independently represent $SiR_cR_d$, two $R_c$ groups bonded to separate silicon atoms together form a saturated hydrocarbon chain, the two $R_c$ groups, together with said silicon atoms and X, forming a 6- to 10-membered ring; or else
when $Y^1$ and $Y^2$ independently represent $CR_aR_b$, two $R_a$ groups bonded to separate carbon atoms together form a saturated hydrocarbon chain, the two $R_a$ groups, together with the carbon atoms which carry them and X, forming a 6- to 10-membered ring; and
$R_f$ and $R_g$ represent, independently of one another, a hydrogen atom; an alkyl group; an acyl group; an aryl group optionally substituted by alkyl; a cycloalkyl group optionally substituted by alkyl; an arylalkyl group in which the aryl part is optionally substituted by alkyl; a halogen atom; an alkenyl group; an alkynyl group; or an $SiG_1G_2G_3$ group where $G_1$, $G_2$ and $G_3$ are, independently of one another, alkyl; alkoxy; aryl optionally substituted by alkyl or alkoxy; or arylalkyl in which the aryl part is optionally substituted by alkyl or alkoxy;

b) a combination of (a) with at least one other platinum complex selected from the complexes: platinum in the zero oxidation state, platinum in the +2 oxidation state or platinum in the +4 oxidation state.

The compositions C additionally comprising the stabilizing additive in accordance with the present invention cure to result in elastomers, the decomposition of which under the effect of very high temperatures is much less in comparison with that which occurs with the platinum-based stabilizers of the prior art and in particular with the most efficient of them, consisting of Karstedt platinum and anhydrous chloroplatinic acid.

The term "very high temperatures" is understood to mean in particular temperatures of greater than 500° C., preferably of greater than 800° C. It is possible in particular to regard, as very high temperatures, temperatures for example of greater than 200° C., indeed even 250° C., when the residence time at these temperatures is prolonged, for example greater than 200 hours, preferably greater than 240 hours.

DETAILED DESCRIPTION OF A PREFERRED EMBODIMENT

The definition of the platinum complexes a) of formula (I) is supplemented below.

The term "alkyl" denotes a saturated, optionally substituted (e.g. by one or more alkyls), linear or branched hydrocarbon chain, preferably of 1 to 10 carbon atoms, for example of 1 to 8 carbon atoms, better still of 1 to 7 carbon atoms.

Examples of alkyl groups are in particular methyl, ethyl, isopropyl, n-propyl, tert-butyl, isobutyl, n-butyl, n-pentyl, isoamyl and 1,1-dimethylpropyl.

The alkyl part of the alkoxy radical is as defined above.

The term "cycloalkyl" is understood to mean a saturated, mono- or polycyclic, preferably mono- or bicyclic, hydrocarbon radical preferably exhibiting from 3 to 10 carbon atoms, better still from 3 to 8. The term "saturated polycyclic hydrocarbon radical" is understood to mean a radical exhibiting two or more cyclic nuclei attached to one another via σ bonds and/or fused in pairs.

Examples of polycyclic cycloalkyl groups are adamantane and norbornane.

Examples of monocyclic cycloalkyl groups are cyclopropyl, cyclobutyl, cyclopentyl, cyclohexyl, cycloheptyl and cyclooctyl.

The term "perfluorinated alkyl" denotes an alkyl comprising at least one perfluoroalkyl group, preferably having the formula:

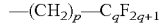
—(CH$_2$)$_p$—C$_q$F$_{2q+1}$ in which p represents 0, 1, 2, 3 or 4; q is an integer from 1 to 10; and C$_q$F$_{2q+1}$ is linear or branched. Preferred examples of this radical are: —(CH$_2$)$_2$—(CF$_2$)$_5$—CF$_3$ and —(CF$_2$)$_7$—CF$_3$.

The expression "aryl" denotes an aromatic, monocyclic or polycyclic and preferably monocyclic or bicyclic, hydrocarbon group having from 6 to 18 carbon atoms. It should be understood that, in the context of the invention, the term "aromatic polycyclic radical" is understood to mean a radical exhibiting two or more aromatic nuclei which are fused (ortho-fused or ortho- and peri-fused) to one another, that is to say exhibiting, in pairs, at least two common carbons.

Said aromatic hydrocarbon group ("aryl") is optionally substituted, for example, by one or more C$_1$-C$_3$ alkyls, one or more halogenated hydrocarbon radicals (e.g., CF$_3$), one or more alkoxys (e.g., CH$_3$O) or one or more hydrocarbon radicals comprising one or more ketone units (e.g., CH$_3$CO—).

Mention may be made, as examples of aryl, of the phenyl, naphthyl, anthryl and phenanthryl radicals.

The expression "arylalkyl" denotes an alkyl group as defined above substituted by one or more aryl groups on its hydrocarbon chain, the aryl group being as defined above. Examples thereof are benzyl and triphenylmethyl.

The term "acyl" is understood to mean an R°—CO— group where R° represents an alkyl as defined above; or else an Ar—CO— group where Ar represents an aryl group as defined above or else an arylalkyl in which "aryl" and "alkyl" are as defined above and in which the aryl part is optionally substituted, e.g. by an alkyl.

The term "alkenyl" is understood to mean an unsaturated, substituted or unsubstituted, linear or branched, hydrocarbon chain exhibiting at least one olefinic double bond and more preferably a single double bond. Preferably, the alkenyl group exhibits from 2 to 8 carbon atoms, better still from 2 to 6. This hydrocarbon chain optionally comprises at least one heteroatom, such as O, N or S.

Preferred examples of alkenyl groups are the allyl and homoallyl groups.

The term "alkynyl" is understood to mean, according to the invention, an unsaturated, substituted or unsubstituted, linear or branched, hydrocarbon chain exhibiting at least one acetylenic triple bond and more preferably a single triple bond. Preferably, the alkynyl group exhibits from 2 to 8 carbon atoms, better still from 2 to 6 carbon atoms. Mention may be made, by way of examples, of the acetylenyl group and the propargyl group. This hydrocarbon chain optionally comprises at least one heteroatom, such as O, N or S.

The expression "does not represent anything" means that the substituents -T$_3$ and -T$_4$ respectively do not exist. This is because, in the formula (II), the nitrogen atom is trivalent, so that, when A or B represents N, the nitrogen atom cannot exhibit an additional substituent.

Preferably, in the carbene ligands of formula (II):

T$_3$ and T$_4$ represent a hydrogen atom or together form a phenyl, and/or T$_1$ and T$_2$, which are identical or different, represent (C$_1$-C$_8$) alkyl or (C$_3$-C$_8$) cycloalkyl, preferably in the group of radicals comprising: methyl, n-propyl, n-pentyl, neopentyl (—CH$_2$—C(CH$_3$)$_3$), cyclopentyl, cyclohexyl, adamantyl, allyl (—CH$_2$—CH=CH$_2$), methallyl (—CH$_2$—C(CH$_3$)=CH$_2$), propargyl, homopropargyl (—(CH$_2$)$_2$—C≡CH), or

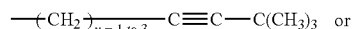
—(CH$_2$)$_{y=1\ to\ 3}$—C≡C—C(CH$_3$)$_3$   or

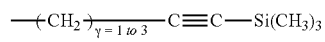
—(CH$_2$)$_{y=1\ to\ 3}$—C≡C—Si(CH$_3$)$_3$ or again: —(CH$_2$)$_{y=1\ to\ 4}$-amine (for example N(CH$_3$)$_2$) or —(CH$_2$)$_{y=1\ to\ 4}$-alkoxy (for example O(CH$_3$)$_2$);

and/or A and B both represent a carbon atom.

According to an alternative form, the carbenes of formula (II) corresponding to the ligand L$_y$ can exhibit at least two fused nuclei, that is to say that two substituents at least from T$_1$, T$_2$, T$_3$ and T$_4$ situated on two adjacent ring members together form a saturated or unsaturated hydrocarbon chain preferably exhibiting from 3 to 6 carbon atoms. The term "saturated or unsaturated hydrocarbon chain" is understood to mean a linear or branched hydrocarbon chain which may or may not exhibit one or more unsaturations of olefinic double bond or acetylenic triple bond type.

When the carbenes (II) exhibit two fused nuclei, they thus correspond to one of the following formulae, in which (alk) represents a saturated or unsaturated hydrocarbon chain:

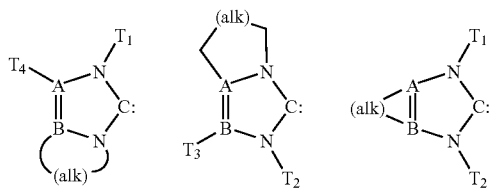

The ligands $L_\alpha$ and $L_\beta$ product of formula (I) can independently represent an alkynyl of formula (III.1) or an alkenyl of formula (III.2) substituted by radicals $Z^1$ to $Z^6$ carrying at least one electron—withdrawing unit which is active with regard to the π-unsaturation of $L_\alpha$ and $L_\beta$ to promote the liganding with the platinum of the complex.

Advantageously, in the formulae (III.1) and (III.2), the electron-withdrawing residues are chosen from the group consisting of:

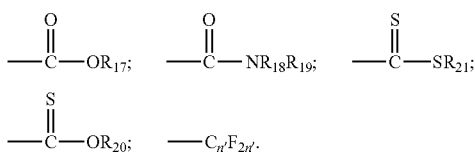

in which: $R_{17}$, $R_{18}$, $R_{19}$ or $R_{20}$ is an alkyl, an alkenyl, an alkynyl or a trialkylsilyl which may or may not be substituted, and n' is between 1 and 50.

Mention may be made, as examples of radicals $Z^1$ to $Z^6$, of:

those selected from the group consisting of: —CN, —COOCH$_3$, —COOCH$_2$CH$_3$, —CONC$_{12}$H$_{25}$ and —COO—CH$_2$—CH=CH$_2$, and in the cases where the substituents $Z^1$ and $Z^2$ form, in pairs and with the triple bond, in (III.1), a ring Cy1 and where $Z^3$ to $Z^6$ form, in pairs, with or without the double bond, in (III.2), a ring Cy2, these rings Cy1 and Cy2 are independently and preferably chosen from the group consisting of the following rings:

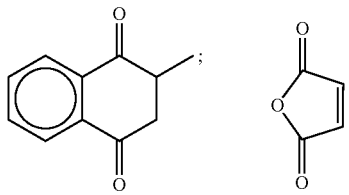

When $L_\alpha$ and $L_\beta$ together form a ligand $L_\alpha$ of formula (IV), the latter is preferably the type of those in which $Y^1$ and $Y^2$ represent either both $CR_aR_b$ or both $SiR_cR_d$, so that said complexes are either of formula (IV.1) or of formula (IV.2):

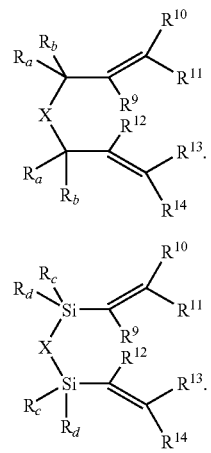

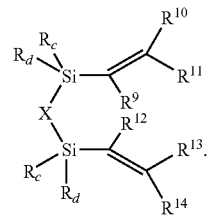

where:
the two $R_a$ groups, the two $R_b$ groups, the two $R_c$ groups and the two $R_d$ groups are identical to one another, and $R^9=R^{12}$; $R^{10}=R^{14}$; and $R^{11}=R^{13}$.

According to an alternative form, the two $R_c$ groups in (IV.2) together form:
(a) either a chain

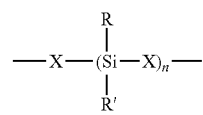

in which n is an integer from 1 to 5; X is as defined above; and R and R', which are identical or different, take any one of the meanings given above for $R_c$ or $R_d$;

(b) or a saturated hydrocarbon chain so that the two substituents $R_c$, together with the two silicon atoms which carry them and X, form a 6- to 10-membered ring, preferably a 6- to 8-membered ring.

When the two $R_c$ groups form the chain (a) in (IV.2), it is preferable for n to have the value 1 or 2 and for $R=R_d$, the two $R_d$ groups carried by the two silicon atoms being identical. In this case, $R_d$ preferably represents alkyl, for example methyl. Better still, in these compounds, R' represents —CR$^{12}$=CR$^{13}$R$^{14}$; R$^{13}$=R$^{11}$; R$^{10}$=R$^{14}$; and R$^{12}$=R$^9$.

In this case, it is preferable for X to represent O in (IV.2). The ligand $L_\delta$ then has the formula:

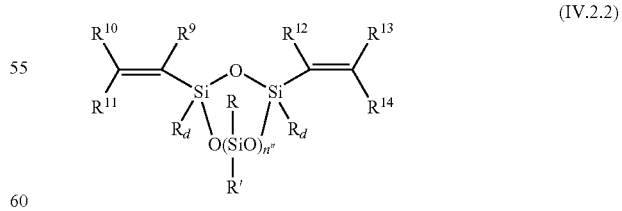

Among these compounds, it is preferable for the two $R_d$ groups to be identical and advantageously to represent alkyl (for example methyl).

Preferably, n has the value 1 or 2 and $R=R_d$, it being understood that, when n has the value 2, just one silicon atom of the O—(SiRR'—O)$_n$— chain can be substituted by one or two alkenyl or alkynyl groups. Better still, R'=CR¹²=CR¹³R¹⁴ and R¹³=R¹¹; R¹⁰=R¹⁴; and R¹²=R⁹.

When the two $R_c$ groups form, together with the two silicon atoms and the group X, the chain (b), it is preferable for the two $R_c$ groups to be an 8-membered ring. In this case, it is preferable for the two $R_d$ groups to be identical. The ligand $L_δ$ then has the formula:

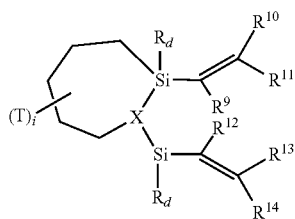
(IV.2.3)

where T represents alkyl, i is an integer between 0 and 5, T being situated on one or more of the 1, 2, 3, 4 and 5 ring members of the above formula.

In the same way, when $Y^1$ and $Y^2$ represent $CR_aR_b$ in (IV.1), the two $R_a$ groups bonded to separate carbon atoms can together form a saturated hydrocarbon chain (c) so that the two $R_a$ groups, together with the carbons which carry them and X, form a 6- to 10-membered ring. Preferably, the ring formed is an 8-membered ring, in which case the ligand $L_δ$ then has the formula:

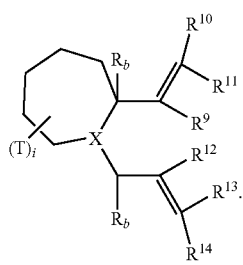
(IV.1.1)

where T represents alkyl; i is an integer between 0 and 5, T being situated on one or more of the 1, 2, 3, 4 and 5 ring members of the above formula.

When $R_f$ and/or $R_g$ represents $SiG_1G_2G_3$, it is preferable for $R_f$ and/or $R_g$ to be trialkylsilyl, for example $SiG_1G_2G_3$ where $G_1=G_2=G_3$=alkyl.

Subgroups of the ligands $L_δ$ of the metal complexes participating in the composition according to the invention are composed of the complexes for which:

X=O; $Y^1$ and $Y^2$ independently represent $SiR_cR_d$; or
X=$NR_e$; $Y^1$ and $Y^2$ independently represent $CR_aR_b$; or
X=$NR_e$; $Y^1$ and $Y^2$ independently represent $SiR_cR_d$; or
X=$CR_fR_g$; $Y^1$ and $Y^2$ independently represent $CR_aR_b$; or
X=$CR_fR_g$; $Y^1$ and $Y^2$ independently represent $SiR_cR_d$.

Preference is given, among these ligands $L_δ$ of formula (IV), to those for which:

when X represents O, $Y^1$ and $Y^2$ independently represent $SiR_cR_d$; or
when X represents $NR_e$, $Y^1$ and $Y^2$ independently represent $CR_aR_b$; or
when X represents $CR_fR_g$, $Y^1$ and $Y^2$ independently represent $CR_aR_b$.

In practice, X represents O and $Y^1$ and $Y^2$ independently represent $SiR_cR_d$ in the ligand $L_δ$ of formula (IV).

In the context of the invention, the expression "independently represent" means that the substituents denoted are either identical or different.

For example, $R^{10}$, $R^{11}$, $R^{13}$ and $R^{14}$ are hydrogen atoms in the ligands $L_δ$ of formula (IV).

Preferred meanings of $R^9$ and $R^{12}$ are in particular a hydrogen atom; an alkyl group; an aryl group optionally substituted by alkyl; and a cycloalkyl group optionally substituted by alkyl. Among these preferred meanings, it is particularly advantageous for $R^9$ and $R^{12}$, which are identical, to represent a hydrogen atom; ($C_3$-$C_8$)cycloalkyl or ($C_1$-$C_8$)alkyl.

For example, the diolefinic ligand $L_δ$ of formula (IV) is symmetrical, that is to say that $R^{10}=R^{14}$; $R^{11}=R^{13}$; $R^9=R^{12}$ and the two groups $Y^1$ and $Y^2$ are: either strictly identical to one another, or $Y^1=CR_aR_b$ and $Y^2=CR_aR_b$, where the two $R_a$ groups together form a symmetrical chain, or also $Y^1=SiR_cR_d$ and $Y^2=SiR_cR_d$, where the two $R_c$ groups together form a symmetrical chain.

As regards the platinum complex (a) according to the invention, it is appropriate to mention a first particularly preferred group of metal complexes of following formula (I.1):

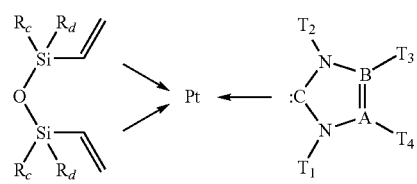
(I.1)

in which:

$T_1$ and $T_2$ are identical and are as defined above;
$T_3$ and $T_4$ are as defined above;
$R_c$ and $R_d$ are as defined above.

A second particularly preferred group of catalysts —C— of the composition according to the invention comprises the metal complexes of following formula (I.2):

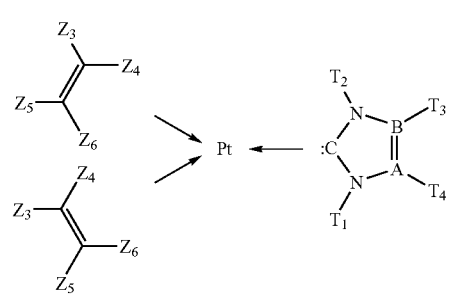
(I.2)

in which:

$T_1$ and $T_2$ are identical and are as defined above;
$T_3$ and $T_4$ are as defined above;
$R_c$ and $R_d$ are as defined above.

A third particularly preferred group of complexes (a) according to the invention comprises the metal complexes of following formula (I.3):

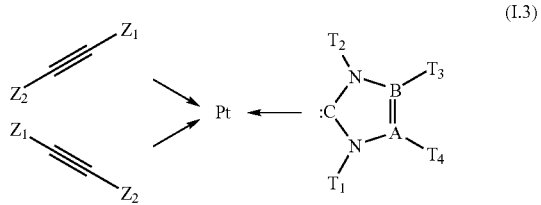

in which:
$T_1$ and $T_2$ are identical and are as defined above;
$T_3$ and $T_4$ are as defined above;
$R_c$ and $R_d$ are as defined above.

The preparation of the metal complexes of formula (I) is touched on below. Such complexes can be obtained from complexes (I) in which $L_\gamma$ is of formula (II) and $L_\alpha$ and $L_\beta$ together form a ligand of formula (IV), the latter being displaced in situ by compounds of formula (III.1) or (III.2).

These complexes (I) in which $L_\gamma$ is of formula (II) and $L_\alpha$ and $L_\beta$ together form a ligand of formula (IV) are prepared conventionally, for example from known complexes of the state of the art by ligand exchange, that is to say by addition of the appropriate carbene of formula (II) to a platinum metal complex in solution, denoted precursor complex.

Appropriate precursor complexes are, for example, the Karstedt complex of formula:

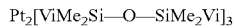

in which Vi represents the vinyl radical.

These ligands are either commercially available or are easily prepared by a person skilled in the art from commercially available compounds. For further details, reference may be made to the information given in WO-A-01/42258, in particular to pages 15 to 18 of this document.

The carbenes of formula (II) can be prepared by deprotonation of imidazolium salts, tetrazolium salts, triazolium salts or pyrazolium salts, as the case may be, under the action of a base.

These reactions can be rendered schematically as follows:

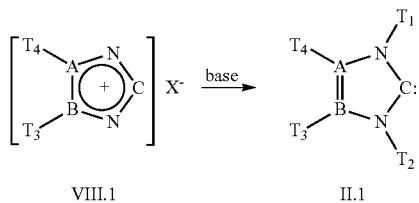

In these reaction schemes, $T_1$, $T_2$, $T_3$, $T_4$, A and B are as defined above for the formula (I) and $X^-$ represents an anion.

The nature of the anion $X^-$ is not critical according to the invention. The anion $X^-$ is the anion derived from an organic or inorganic Brönsted acid (protic acid). Usually, the anion $X^-$ derived from an acid exhibiting a pKa of less than 6. Preferably, $X^-$ derives from an acid with a pKa of less than 4, better still less than 2. The pKa values concerned with here are the pKa values of the acids as measured in water.

Examples of acids are: carboxylic acids, such as acetic acid, benzoic acid or stearic acid; sulfonic acids, such as benzenesulfonic acid; and phosphonic acids, such as phenylphosphonic acid.

According to the invention, preference is more particularly given to the anions $X^-$ derived from the acids HF, HCl, HBr, HI, $H_2SO_4$, $HBF_4$ and $H_3PO_4$.

The bases which can be used for the deprotonation of the salts of formula (VIII.1) are strong bases chosen from alkali metal hydrides, alkali metal hydroxides, alkali metal carboxylates, alkali metal alkoxides and alkali metal amides.

Examples of an appropriate base are thus sodium hydride, sodium methoxide, potassium tert-butoxide, lithium diisopropylamide and their mixtures.

The deprotonation reaction is preferably carried out in a solvent capable of at least partially dissolving the starting salt of formula (VIII.1) and the other reactants.

The nature of the solvent also depends on the strength of the base. This is because, in the case of a strong base and of particularly reactive starting salts, it may be necessary to operate at low temperature.

Generally, the reaction temperature is between 40° C. and −78° C., preferably between 30 and −50° C., better still between 25 and −40° C., for example between 20 and −30° C.

Solvents which can be used in the process for the preparation of the carbenes are cyclic or noncyclic ethers, such as diethyl ether, diisopropyl ether, tetrahydrofuran, dioxane, dimethoxyethane or diethylene glycol dimethyl ether.

The methods for preparing the carbenes of formula (II) are described in WO-A-01/42258, in particular on pages 20 and 21.

According to a particularly preferred embodiment of the invention, the metal complex of the invention has the formula:

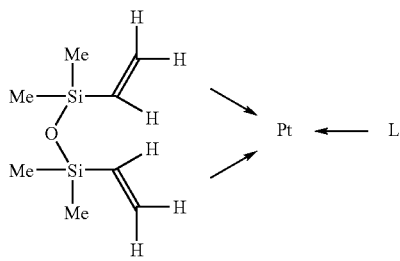

in which $L_\gamma$ is as defined above.

A simple method for the preparation of this complex consists in reacting the carbene $L_\gamma$ with the Karstedt catalyst of mean formula $Pt_2[ViMe_2Si—O—SiMe_2Vi]_3$ in which Vi represents the vinyl radical.

This reaction can be carried out in bulk or in a solvent.

Examples of appropriate solvents are cyclic or noncyclic ethers, amides and aromatic hydrocarbons.

The reaction temperature usually varies between 10 and 50° C., preferably between 15 and 35° C., very preferably between 20 and 25° C. It is desirable to operate in the presence of a slight excess of carbene with respect to the platinum.

For further details on the ways of carrying out this reaction, reference may be made to the information given in WO-A-02/098971, in particular to pages 40 to 43 of this document.

The definition of the other platinum complexes employed in the case of the combinations b) is completed below.

A preferred group of said other platinum complexes comprises the following entities:
hexachloroplatinic acid $H_2PtCl_6$ and its derivatives;
complexes of formula $(PtCl_2.olefin)_2$, the olefin of the complex representing in particular ethylene, propylene, butylene, cyclohexene or styrene; and
complexes of platinum and of vinylated organopolysiloxanes, such as, in particular, the Karstedt catalyst.

Definitions of the Silicone Compositions

The curable polyorganosiloxane compositions C targeted in the context of the present invention, presented in just one or in several packaging(s) (single- or multicomponent), include a main constituent formed of one or more polyorganosiloxane constituent(s), an appropriate catalyst and optionally one or more compound(s) taken from the group formed in particular by: reinforcing or semireinforcing or bulking fillers or fillers used to adjust the rheology of the curable compositions, and the auxiliary additives commonly used in this field of technology.

The polyorganosiloxanes which are the main constituents of the compositions C targeted in the context of the invention can be linear, branched or crosslinked and can comprise hydrocarbon radicals and/or reactive groups consisting of alkenyl groups and hydrogen atoms. It should be noted that polyorganosiloxane compositions are fully described in the literature and in particular in the work by Walter Noll: "Chemistry and Technology of Silicones", Academic Press, 1968, 2nd edition, pages 386 to 409.

More specifically, the polyorganosiloxanes which are the main constituents of the compositions C targeted in the context of the invention are composed of siloxyl units of general formula:

$$R_n SiO_{\frac{4-n}{2}} \quad (V)$$

and/or of siloxyl units of formula:

$$Z_x R_y SiO_{\frac{4-x-y}{2}} \quad (VI)$$

in which formulae the various symbols have the following meanings:
  the R symbols, which are identical or different, each represent a group of nonhydrolyzable hydrocarbon nature, it being possible for this radical to be:
    an alkyl or haloalkyl radical having from 1 to 5 carbon atoms and comprising from 1 to 6 chlorine and/or fluorine atoms,
    cycloalkyl and halocycloalkyl radicals having from 3 to 8 carbon atoms and comprising from 1 to 4 chlorine and/or fluorine atoms,
    aryl, alkylaryl and haloaryl radicals having from 6 to 8 carbon atoms and comprising from 1 to 4 chlorine and/or fluorine atoms,
    cyanoalkyl radicals having from 3 to 4 carbon atoms;
  the Z symbols each represent a hydrogen atom or a $C_2$-$C_6$ alkenyl group;
  n=an integer equal to 0, 1, 2 or 3;
  x=an integer equal to 0, 1, 2 or 3;
  y=an integer equal to 0, 1 or 2;
  the sum x+y lies in the range extending from 1 to 3.

By way of illustration, mention may be made, among the organic radicals R directly bonded to the silicon atoms, of: the methyl, ethyl, propyl, isopropyl, butyl, isobutyl, n-pentyl, t-butyl, chloromethyl, dichloromethyl, α-chloroethyl, α,β-dichloroethyl, fluoromethyl, difluoromethyl, α,β-difluoroethyl, 3,3,3-trifluoropropyl, trifluorocyclopropyl, 4,4,4-trifluorobutyl, 3,3,4,4,5,5-hexafluoropentyl, β-cyanoethyl, γ-cyanopropyl, phenyl, p-chlorophenyl, m-chlorophenyl, 3,5-dichlorophenyl, trichlorophenyl, tetrachlorophenyl, o-, p- or m-tolyl, α,α,α-trifluorotolyl or xylyl, such as 2,3-dimethylphenyl or 3,4-dimethylphenyl, groups.

Preferably, the organic radicals R bonded to the silicon atoms are methyl or phenyl radicals, it being possible for these radicals optionally to be halogenated, or again cyanoalkyl radicals.

The Z symbols are hydrogen atoms or alkenyl groups which are preferably vinyl groups.

The nature of the polyorganosiloxane and thus the ratios of the siloxyl units (V) to the siloxyl units (VI) and the distribution of these is, as is known, chosen according to the crosslinking treatment which will be carried out on the curable composition for the purpose of converting it to an elastomer.

Two-component or single-component polyorganosiloxane compositions C which crosslink at ambient temperature or with heat by polyaddition reactions, essentially by reaction of hydrosilyl groups with alkenylsilyl groups, in the presence of a metal catalyst, generally a platinum-based catalyst, are described, for example, in U.S. Pat. Nos. 3,220,972, 3,284,406, 3,436,366, 3,697,473 and 4,340,709. The polyorganosiloxanes participating in these compositions are generally composed of pairs based, on the one hand, on a linear, branched or crosslinked polysiloxane composed of units (VI) in which the Z residue represents a $C_2$-$C_6$ alkenyl group and where x is at least equal to 1, optionally in combination with units (V) and, on the other hand, on a linear, branched or crosslinked hydropolysiloxane composed of units (VI) in which the Z residue then represents a hydrogen atom and where x is at least equal to 1, optionally in combination with units (V).

In the case of the compositions C which crosslink by polyaddition reactions, referred to as RTVs, the polyorganosiloxane constituent(s) carrying alkenylsilyl groups advantageously exhibit a viscosity at 25° C. at most equal to 10 000 mPa·s and preferably of between 200 and 5000 mPa·s.

In the case of the compositions C which crosslink by polyaddition reactions, referred to as LSRs, the polyorganosiloxane constituent(s) carrying alkenylsilyl groups have a viscosity at 25° C. of greater than 1000 mPa·s, preferably lying in the range extending from a value greater than 5000 mPa·s to 200 000 mPa·s.

In the case of the compositions C which crosslink by polyaddition reactions, referred to as polyaddition HCEs, the polyorganosiloxane constituent(s) carrying alkenylsilyl groups have a viscosity at 25° C. of greater than 300 000 mPa·s and preferably of between 1 million mPa·s and 30 million mPa·s and even more.

In the case of the polyorganosiloxane compositions C referred to as RTVs, LSRs or polyaddition HCEs, the polyorganosiloxane constituent(s) carrying hydrosilyl groups generally have a viscosity at 25° C. at most equal to 10 000 mPa·s and preferably of between 5 and 1000 mPa·s.

The compositions concerned may also be compositions C curable at high temperature under the action of organic peroxides. The polyorganosiloxane or gum participating in such compositions, referred to as HCEs, is then composed essentially of siloxyl units (V), optionally in combination with units (VI) in which the Z residue represents a $C_2$-$C_6$ alkenyl group and where x is equal to 1. Such HCEs are described, for example, in U.S. Pat. Nos. 3,142,655, 3,821,140, 3,836,489 and 3,839,266.

The polyorganosiloxane constituent of these HCE compositions advantageously exhibits a viscosity at 25° C. at least equal to 300 000 mPa·s and preferably of between 1 million and 30 million mPa·s and even more.

The curable compositions C targeted in the context of the invention can additionally comprise, in addition to the polyorganosiloxane constituent(s), the catalyst and optionally the auxiliary additive(s), reinforcing or semireinforcing or bulking fillers or fillers which are used to adjust the rheology, which are preferably chosen from siliceous fillers.

The reinforcing fillers are generally chosen from fumed silicas and precipitated silicas. They have a specific surface, measured according to the BET methods, of at least 50 m$^2$/g, preferably greater than 100 m$^2$/g, and a mean particle size of less than 0.1 micrometer (μm).

These silicas can be incorporated preferably as is or after having been treated with organosilicon compounds generally employed for this use. These compounds include methylpolysiloxanes, such as hexamethyldisiloxane or octamethylcyclotetrasiloxane, methylpolysilazanes, such as hexamethyldisilazane or hexamethylcyclotrisilazane, chlorosilanes, such as dimethyldichlorosilane, trimethylchlorosilane, methylvinyldichlorosilane or dimethylvinylchlorosilane, or alkoxysilanes, such as dimethyldimethoxysilane, dimethylvinylethoxysilane or trimethylmethoxysilane. During this treatment, the silicas can increase their starting weight by up to a level of 20%, preferably 10%, approximately.

The semireinforcing or bulking fillers or fillers which are used to adjust the rheology have a BET specific surface of less than 100 m$^2$/g and a mean particle size of greater than 0.1 μm and are preferably chosen from ground quartz, calcined clays, diatomaceous earths and zirconia.

Use may be made, when there is need thereof, of 0.5 to 200% by weight, preferably of 1 to 150% by weight, of filler(s), with respect to the weight of the organopolysiloxane constituent(s) of the compositions C.

Polyorganosiloxane compositions C which are preferred in the context of the present invention are those, single-component or two-component, which crosslink at ambient temperature or with heat by polyaddition reactions, referred to as RTVs, which comprise:
(a) 100 parts by weight of at least one polydiorganosiloxane chosen from linear homopolymers and copolymers exhibiting, per molecule, at least 2 vinyl groups bonded to different silicon atoms situated in the chain and/or at the chain ends, the other organic radicals of which bonded to silicon atoms are chosen from the methyl, ethyl and phenyl radicals, at least 60 mol % of these other radicals (and preferably all of these other radicals) being methyl radicals, and exhibiting a mean viscosity ranging from 200 to 5000 mPa·s at 25° C.;
(b) at least one polyorganohydrosiloxane chosen from linear or cyclic homopolymers and copolymers exhibiting, per molecule, on average at least 2 hydrogen atoms bonded to different silicon atoms, the organic radicals of which bonded to silicon atoms are chosen from the methyl, ethyl and phenyl radicals, at least 60 mol % of these radicals (and preferably all of these radicals) being methyl radicals, and exhibiting a viscosity ranging from 5 to 1000 mPa·s at 25° C., the reactant (b) being used in amounts such that the molar ratio of the hydride functional groups of (b) to the vinyl groups of (a) is between 1.0 and 10;
(c) a catalytically effective amount of a platinum catalyst;
(d) 0 to 120 part(s) by weight, preferably from 0 to 100 parts by weight, of siliceous filler(s) per 100 parts by weight of the combination of the polyorganosiloxanes (a)+(b).

According to an alternative embodiment, up to 100% by weight of the reactant (a) is replaced by a polyorganosiloxane resin comprising, in its structure, from 0.1 to 20% by weight of vinyl group(s), said structure exhibiting at least two different units chosen from the units M (triorganosiloxyl), D (diorganosiloxyl), T (monoorganosiloxyl) and Q (SiO$_{4/2}$), at least one of these units being a T or Q unit, it being possible for the vinyl group(s) to be carried by the M, D and/or T units.

The reactant (a) can advantageously be a linear polydiorganosiloxane, the chain of which is composed essentially of units (V) where n=2, this chain being blocked at each end by a unit (VI) where Z=vinyl and where x=1 and y=2.

The reactant (b) can advantageously be: a linear polyorganohydrosiloxane comprising, in its structure, at least 3 hydrogen atoms bonded to silicon, the chain of which is composed essentially of units (VI) where Z=H and where x=y=1, optionally in combination with units (V) where n=2, this chain being blocked at each end by a unit (VI) where Z=H and where x=1 and y=2 or by a unit (V) where n=3; or a mixture of said polyorganohydrosiloxane with another linear polyorganohydrosiloxane, the chain of which is composed essentially of units (V) where n=2, this chain being blocked at each end by a unit (VI) where Z=H and where x=1 and y=2.

The amount by weight of catalyst (c), calculated as parts by weight of platinum metal, is generally between 1 and 250 ppm, preferably between 2 and 100 ppm, based on the weight of the combination of the organosiloxanes (a)+(b).

Other preferred polyorganosiloxane compositions C are those, single-component or two-component, which crosslink with heat by polyaddition reactions, referred to as LSR compositions. These compositions correspond to the definitions given above with regard to the preferred compositions referred to as RTVs, except as regards the viscosity of the vinylated polydiorganosiloxane reactant (a), which this time is greater than 1000 mPa·s and preferably lies in the range extending from a value greater than 5000 mPa·s to 200 000 mPa·s.

Other preferred polyorganosiloxane compositions C are those, single-component or two-component, which crosslink with heat by polyaddition reactions, referred to as polyaddition HCE compositions, which comprise:
(a') 100 parts by weight of at least one polydiorganosiloxane gum which is a linear homopolymer or copolymer exhibiting, per molecule, at least 2 vinyl groups bonded to different silicon atoms situated in the chain and/or at the chain ends, the other organic radicals of which bonded to silicon atoms are chosen from the methyl, ethyl or phenyl radicals, at least 60 mol % of these other radicals (and preferably all of these other radicals) being methyl radicals, and said gum exhibiting a viscosity of greater than 300 000 mPa·s at 25° C. and preferably of at least 1 million mPa·s;
(b') at least one polyorganohydrosiloxane chosen from linear, cyclic or network homopolymers or copolymers exhibiting, per molecule, at least 3 hydrogen atoms bonded to different silicon atoms, the organic radicals of which bonded to silicon atoms are chosen from the methyl, ethyl or phenyl radicals, at least 60 mol % of these radicals (and preferably all of these radicals) being methyl radicals, and exhibiting a viscosity ranging from 5 to 1000 mPa·s at 25° C., the reactant (b') being used in amounts such that the molar ratio of the hydride functional groups of (b') to the vinyl groups of (a') is between 0.4 and 10 and preferably between 1.1 and 7;
(c') a catalytically effective amount of a platinum catalyst;
(d') 0.5 to 120 part(s) by weight, preferably from 1 to 100 parts by weight, of siliceous filler(s) per 100 parts by weight of the combination of the polyorganosiloxanes (a')+(b').

The gum (a') is composed, along its chain, of units (V) where n=2, optionally in combination with units (VI) where Z=vinyl and where x=y=1, and it is blocked at each end of its chain by a unit (VI) where Z=vinyl and where x=1 and y=2 or by a unit (V) where n=3.

Advantageously, use is made, as constituent (b'), of at least one linear polyorganohydrosiloxane, the chain of which is composed essentially of units (VI) where Z=H and where x=y=1, optionally in combination with units (V) where n=2, this chain being blocked at each end by a unit (VI) where Z=H and where x=1 and y=2 or by a unit (V) where n=3.

The amount by weight of catalyst (c'), expressed as parts by weight of platinum metal with respect to the weight of the gum (a') and the hydrosilyl compound (b'), is between 1 and 250 ppm and preferably between 3 and 100 ppm.

Other preferred polyorganosiloxane compositions C are also those, single-component, referred to as HCEs, comprising:
(a") 100 parts by weight of at least one polydiorganosiloxane gum which is a linear homopolymer or copolymer exhibiting, per molecule, at least 2 vinyl groups bonded to different silicon atoms situated in the chain and/or at the chain ends, the other organic radicals of which bonded to silicon atoms are chosen from the methyl, ethyl or phenyl radicals, at least 60 mol % of these other radicals (and preferably all of these other radicals) being methyl radicals, and said gum exhibiting a viscosity of at least 300 000 mPa·s at 25° C. and preferably of at least 1 million mPa·s;
(b") 0.1 to 7 parts by weight of an organic peroxide;
(c") 0.5 to 120 parts by weight, preferably from 1 to 100 parts by weight, of siliceous filler(s) per 100 parts by weight of gum (a").

The gum (a") can advantageously be: a linear polydiorganosiloxane, the chain of which is composed essentially of units (V) where n=2, optionally in combination with units (VI) where Z=vinyl and where x=y=1, and it is blocked at each end of its chain by a unit (VI) where Z=vinyl and where x=1 and y=2; or a mixture of said polydiorganosiloxane with another linear polydiorganosiloxane, the chain of which is composed essentially of units (V) where n=2 and of units (VI) where Z=vinyl and where x=y=1, this chain being blocked at each end by a unit (V) where n=3.

The organic peroxides (b") are used in a proportion of 0.1 to 7 parts, preferably 0.5 to 3 parts, per 100 parts of the gums (a"). They are well known to experts and comprise more especially benzoyl peroxide, 2,4-dichlorobenzoyl peroxide, dicumyl peroxide, 2,5-bis(t-butylperoxy)-2,5-dimethylhexane, t-butyl perbenzoate, t-butylperoxy isopropyl carbonate, di(t-butyl) peroxide or 1,1-bis(t-butylperoxy)-3,3,5-trimethylcyclohexane.

The amount of specific platinum compound(s) [additive(s) (a)+optionally (b)] used as stabilizer, expressed in parts by weight of elemental platinum with respect to the total weight of the polyorganosiloxane constituent(s) of the curable compositions C [(a+b) or (a'+b') or (a")], generally lies in the range extending from 1 to 250 ppm and preferably from 2 to 100 ppm and more preferably still from 3 to 70 ppm.

In the case of the compositions C of RTV, LSR or polyaddition HCE type, the platinum stabilizer employed can advantageously act at the same time, in the context of the amounts indicated above, as catalyst for the polyaddition reactions governing the crosslinking of the curable compositions C.

The silicone compositions C, in addition to the ingredients [(a), (b), (c) and (d)], [(a'), (b'), (c') and (d')] or [(a"), (b") and (c")] specified above, in addition optionally comprise auxiliary additive(s) (e), such as in particular: at least one "antistructuring" product (e1); and/or at least one polysiloxane resin (e2); and/or at least one agent based on a metal oxide or hydroxide or salt (e3); and/or at least one pigment (e4) for manufacturing colored articles; and/or at least one boron-based compound (e5); and/or at least one filler (e6) of flux type and/or of lamellar type which may or may not be used in combination with one or more appropriate inorganic entity(ies) in order to give rise, in the case of a fire, to the formation of an insulating ashy substance; and/or at least one adhesion promoter (e7); and/or at least one crosslinking retarder (e8) in the case of the silicone compositions C which crosslink by polyaddition reactions referred to as RTVs, LSRs or polyaddition HCEs.

More specifically, the auxiliary additive(s) (e), when one or more of them is (are) used, is (are) represented by [per 100 parts by weight of polyorganosiloxane polymer(s) (a+b) or (a'+b') or (a")]:

0.1 to 15 parts by weight of an "antistructuring" product (e1) based, for example, on polydimethyl-siloxane oil(s) with a viscosity of between 10 and 3000 mPa·s at 25° C. and blocked at each chain end by hydroxyl or methoxy groups and/or on poly(methylvinyl)siloxane oil(s) with a viscosity of between 10 and 1000 mPa·s at 25° C. and blocked at each chain end by hydroxyl or methoxy groups and/or on poly(methylphenyl)siloxane oil(s) with a viscosity of between 10 and 1000 mPa·s at 25° C. and blocked at each chain end by hydroxyl or methoxy groups; and/or 0.1 to 5 parts of polysiloxane resin(s) (e2) represented by: "MQ" resins essentially comprising $R'''_3SiO_{0.5}$ and $SiO_2$ units in which R''' represents optionally halogenated monovalent hydrocarbon groups having less than 7 carbon atoms, the $R'''_3SiO_{0.5}$ to $SiO_2$ ratio by weight being between 0.5/1 and 1/2/1; M'Q resins essentially comprising $HR'''_2SiO_{0.5}$ and $SiO_2$ units in which R''' has the meaning given above, the $HR'''_2SiO_{0.5}$ to $SiO_2$ ratio by weight being between 0.5/1 and 10/1; and/or 0.01 to 10 parts of agent(s) (e3), such as in particular: an organic acid metal salt, such as an iron or cerium salt, for example iron or cerium octoate (proportions ranging more specifically from 0.01 to 1 part); a cerium oxide, a cerium hydroxide, a titanium oxide or an iron oxide (proportions ranging more specifically from 0.1 to 10 parts); the oxide CaO, the oxide MgO (proportions ranging more specifically from 0.01 to 0.4 part); zirconia; hydrated or anhydrous alumina; and/or 0.01 to 5 parts of colored pigment(s) (e4); and/or 0.01 to 3 parts of boron-based compound(s) (e5), such as boric acid and its derivatives, for example of the alkyl ester type, the alkyl having from 1 to 3 carbon atoms; and/or 0.2 to 30 parts of a filler (e6) of flux type, such as, for example, ZnO, and/or of lamellar type, such as, for example, mica, optionally in combination with a metal oxide $TiO_2$ and/or a wollastonite; and/or 0.01 to 2 parts of an adhesion promoter (e7) chosen, for example, from organosilicon compounds carrying both (1) hydrolyzable groups bonded to the silicon atom and (2) organic groups substituted by radicals chosen from the group of the isocyanato, epoxy, alkenyl, isocyanurate and (meth)acrylate radicals; and/or 0.005 to 5 parts, preferably from 0.01 to 3 parts, of a crosslinking retarder (e8) chosen, for example, from: organic amines, silazanes, organic oximes, diesters of dicarboxylic acids, acetylenic ketones and in particular, these being preferred inhibitors, acetylenic alcohols (cf., for example, FR-A-1 528 464, 2 372 874 and 2 704 553) and cyclic polydiorganosiloxanes composed essentially of units (VI) where Z=vinyl and where x=y=1, optionally in combination with units (V) where n=2.

Thus it is that the polyorganosiloxane compositions C additionally comprising the stabilizing additive can be single-component compositions, that is to say delivered in a single packaging; if the composition has to be stored before it is used, it may be desirable to add, in the case of the RTV, LSR and polyaddition HCE compositions, an effective amount of an inhibitor (which has been spoken of above) of the catalytic action of the platinum which disappears by heating during the crosslinking of the composition. These compositions C additionally comprising the stabilizing additive can also be two-component compositions, that is to say delivered in two separate packagings, only one of which between them comprises the crosslinking catalyst; in order to obtain the elastomer, the contents of the two packagings are mixed and the crosslinking takes place by virtue of the catalyst. Such single-component and two-component compositions are well known to a person skilled in the art.

The crosslinking of the curable compositions C additionally comprising the stabilizing additive in order to produce the elastomers can be carried out in a way known per se at ambient temperature (23° C.) or at temperatures ranging, for example, from 40° C. to 250° C. according to the type of the composition (RTV, LSR, polyaddition HCE or HCE) employed.

The following examples are given by way of illustration and they may not be regarded as a limit on the scope of the invention.

Examples 1 to 5

1. Preparation of the Carbene of Formula

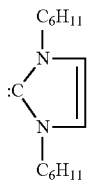

(cf. Chem. Eur. J., 1996, 2, 1627).

For this reaction, all the glassware used is dried in an oven at 150° C. overnight and then cooled under argon.

The THF is distilled over sodium/benzophenone immediately before use.

A 100 ml three-necked flask is charged with 2.70 g (10 mmol) of 1,3-dicyclohexylimidazolinium chloride and then purged with a stream of argon before being suspended in 20 ml of THF. Approximately 50 ml of ammonia are subsequently condensed at −78° C. into the three-necked flask, resulting in the partial dissolution of the salt. The acetone/dry ice bath is removed and 270 mg of 95% NaH (10.7 mmol, 1.07 eq) are slowly added using a solids-charging device. Each addition of NaH is followed by significant evolution of gas (H$_2$) and the salt in suspension gradually dissolves. The reaction mixture is stirred for 1 h 30 at reflux of the solvent. The ammonia is subsequently evaporated and a pale yellow solution is obtained along with a solid in suspension (NaCl).

This solution, the carbene concentration of which is 0.5M in THF, is used immediately for the preparation of the complexes.

2. Preparation of the Platinum-Carbene Complex of Formula

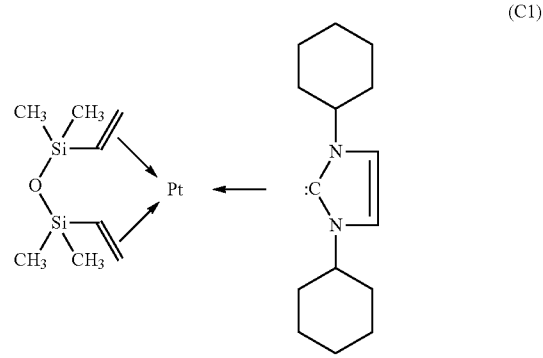

(C1)

A Karstedt solution comprising 10% by weight of platinum (i.e., 1.52 mmol of platinum) is prepared in accordance with the procedure described in U.S. Pat. No. 3,775,452.

3.2 ml of a 0.5M solution of the carbene of formula:

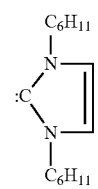

in tetrahydrofuran are added dropwise, using a dropping funnel, to 3 g of this solution, kept stirred and diluted in 10 ml of tetrahydrofuran. The addition is complete after 10 minutes. The reaction mixture is subsequently stirred at ambient temperature for 50 minutes. If appropriate, the insoluble light material is filtered off and the reaction mixture is concentrated under vacuum.

After concentrating, a slightly yellow viscous residue is obtained. In a few hours, a copious white solid precipitates from the residual divinyltetramethyl-disiloxane. This is filtered off and washed with a few milliliters of hexamethyldisiloxane and then with pentane. 570 mg (60% yield) of an analytically pure white powder are thus obtained.

A fraction of this powder is recrystallized from a dichloromethane/absolute ethanol mixture. The resulting crystals are analyzed by X-ray diffraction. The analysis confirms the structure of the complex obtained.

3. Preparation of the Silicone Composition

The following are mixed at ambient temperature (23° C.) in a Z-arm batch mixer:
  92 parts by weight of a polydimethylsiloxane blocked at each of its ends by a dimethylvinylsiloxy unit, comprising 450 ppm of dimethylvinylsiloxy end groups;
  8 parts by weight of a poly(dimethyl)(methylvinyl)siloxane blocked at each of its two ends by a trimethylsiloxy unit, comprising 76 000 ppm of methylvinylsiloxy groups in the chain, having a viscosity of 400 000 mPa·s at 25° C.;

3.3 parts by weight of a polydimethylsiloxane oil blocked at its two ends by dimethylhydroxysiloxy units, comprising 8.5% by weight of OH, with a viscosity of 50 mPa·s at 25° C.;

33 parts by weight of fumed silica having a specific surface of 150 m²/g; and 0.3 part by weight of pulverulent calcium oxide.

After homogenization, the mixture obtained is fractionated into several portions. Each of the homogeneous portions is subsequently worked on a two-roll mixer operating at ambient temperature, by means of which the following are introduced:

a platinum compound, the nature and the proportions of which are shown in table 1 below (the proportions shown are expressed in ppm of platinum metal with respect to the weight of the total composition);

1.25 parts by weight of 50% by weight 2,4-dichlorobenzoyl peroxide, per 100 parts of the mixture of the homogeneous fraction to be crosslinked.

TABLE 1

| Test examples | PLATINUM COMPOUNDS | | | |
|---|---|---|---|---|
| | None | $H_2PtCl_6$ | Karstedt Pt | Pt-carbene complex(*) |
| Control 1 | 0 | 0 | 0 | 0 |
| Control 2 | 0 | 7 | 0 | 0 |
| Control 3 | 0 | 14 | 0 | 0 |
| Control 4 | 0 | 28 | 0 | 0 |
| Control 5 | 0 | 56 | 0 | 0 |
| Control 6 | 0 | 0 | 7 | 0 |
| Control 7 | 0 | 0 | 14 | 0 |
| Control 8 | 0 | 0 | 28 | 0 |
| Control 9 | 0 | 0 | 56 | 0 |
| Example 1 | 0 | 0 | 0 | 3.5 |
| Example 2 | 0 | 0 | 0 | 7 |
| Example 3 | 0 | 0 | 0 | 14 |
| Example 4 | 0 | 0 | 0 | 28 |
| Example 5 | 0 | 0 | 0 | 56 |

(*)complex prepared according to the procedure described in sections 1 and 2 above.

4. Characterization of the Composition

Each fraction is vulcanized by hot pressing in appropriate molds, making possible the production of sample sheets with a thickness of 2 mm; the vulcanization is carried out at 115° C. for 10 minutes.

The temperature stability is evaluated by the content of residues on conclusion of a thermogravimetric analysis carried out using a Mettler TGA thermobalance; the operation is carried out on 20 mg pieces withdrawn from sample sheets, according to a protocol in which the temperature is raised by 80° C. per minute up to 700° C.

The results obtained are listed in table 2 given below:

TABLE 2

Losses in weight in % by weight

| Test examples | PLATINUM COMPOUNDS | | | | Loss in weight in % by weight |
|---|---|---|---|---|---|
| | None | $H_2PtCl_6$ | Karstedt Pt | Pt-carbene complex | |
| Control 1 | 0 | 0 | 0 | 0 | 68 |
| Control 2 | 0 | 7 | 0 | 0 | 63 |
| Control 3 | 0 | 14 | 0 | 0 | 61 |
| Control 4 | 0 | 28 | 0 | 0 | 50 |
| Control 5 | 0 | 56 | 0 | 0 | 47 |
| Control 6 | 0 | 0 | 7 | 0 | 57 |
| Control 7 | 0 | 0 | 14 | 0 | 45 |
| Control 8 | 0 | 0 | 28 | 0 | 46 |
| Control 9 | 0 | 0 | 56 | 0 | 41 |
| Example 1 | 0 | 0 | 0 | 3.5 | 38 |
| Example 2 | 0 | 0 | 0 | 7 | 32 |
| Example 3 | 0 | 0 | 0 | 14 | 29 |
| Example 4 | 0 | 0 | 0 | 28 | 28 |
| Example 5 | 0 | 0 | 0 | 56 | 27 |

The results in table 2 above clearly show the similarity in behavior recorded with chloroplatinic acid and Karstedt platinum, whereas the decomposition is much lower, from the smallest proportions, with the use of the platinum-carbene complex.

Examples 6 and 7

1. Preparation of the Silicone Composition

The following are introduced into a laboratory turbine mixer:

74.8 parts by weight of a suspension which comprises:

14.96 parts by weight of pyrogenic silica, with a BET specific surface of 200 m²/g, surface treated with hexamethyldisilazane (according to the instructions given in the document WO-A-98/58997, pages 6 to 19);

59.84 parts by weight of a polydimethylsiloxane oil blocked at each of the ends of the chains by a dimethylvinylsiloxy unit, having a viscosity of 1600 mPa·s at 25° C.;

17.3 parts by weight of a premix comprising: 40% by weight of ground quartz; 8% by weight of titanium oxide; 0.3% by weight of methacryloyloxy-propyltrimethoxysilane in a polydimethylsiloxane oil blocked at each of the ends of the chains by a dimethylvinylsiloxy unit, having a viscosity of 2000 mPa·s at 25° C.;

0.075 part by weight of 3,7,11-trimethyl-1-dodecyn-3-ol; and 6.85 parts by weight of a poly(dimethyl)(hydromethyl) siloxane oil blocked at each of the ends of the chains by a hydrodimethylsiloxy unit, having a viscosity of 25 mPa·s at 25° C. and comprising, in total, 7.9% by weight of Si—H functional groups, including 6% by weight of Si—H functional groups contributed by the hydromethylsiloxy internal units.

After homogenization, the mixture obtained is fractionated into several portions. A platinum compound, the nature and the proportions of which are shown in table 3 below (the proportions shown are expressed in ppm of platinum metal with respect to the weight of the total composition), is introduced at ambient temperature into each of the homogeneous portions.

TABLE 3

| Test examples | PLATINUM COMPOUNDS | | |
|---|---|---|---|
| | None | Karstedt Pt | Pt-carbene complex(*) |
| Control 10 | 0 | 25 | 0 |
| Control 11 | 0 | 50 | 0 |
| Example 6 | 0 | 0 | 25 |
| Example 7 | 0 | 25 | 3.5 |

(*)complex prepared according to the procedure described in sections 1 and 2 of the abovementioned examples 1 to 5.

2. Characterization of the Composition

Each fraction is vulcanized in the following way: after deaerating, the fraction is cast in an appropriate mold itself placed in a ventilated oven, first at 80° C. for 1 hour and then at 120° C. for 1 other hour.

The temperature stability is evaluated by the content of residues on conclusion of a thermogravimetric analysis carried out using a Mettler TGA thermobalance; the operation is carried out on 20 mg pieces withdrawn from sample sheets, according to a protocol in which the temperature is raised by 20° C. per minute up to 700° C.

The results obtained are listed in table 4 given below:

TABLE 4

Losses in weight in % by weight

| Test examples | PLATINUM COMPOUNDS | | | Loss in weight in % by weight |
|---|---|---|---|---|
| | None | Karstedt Pt | Pt-carbene complex | |
| Control 10 | 0 | 25 | 0 | 54 |
| Control 11 | 0 | 50 | 0 | 53 |
| Example 6 | 0 | 0 | 25 | 51 |
| Example 7 | 0 | 25 | 3.5 | 49 |

Another way of assessing the temperature stability is to monitor the change in Shore A hardness of the elastomer (characteristic measured according to the conditions of the standard DIN 53505) after annealing at 250° C. for 36 hours. The results obtained are collated in table 5:

TABLE 5

| Test examples | PLATINUM COMPOUNDS | | | Increase in hardness in % |
|---|---|---|---|---|
| | None | Karstedt Pt | Pt-carbene complex | |
| Control 10 | 0 | 25 | 0 | 33 |
| Control 11 | 0 | 50 | 0 | 37 |
| Example 5 | 0 | 0 | 25 | 26 |
| Example 6 | 0 | 25 | 3.5 | 27 |

The results presented in tables 4 and 5 show the benefit which there is in using the platinum-carbene complex, taken alone or in combination with Karstedt platinum.

What is claimed is:

1. A composition comprising a stabilizing additive for improving resistance to decomposition of silicone elastomers, the additive comprising:
   a) at least one platinum complex selected from the products of formula (I):

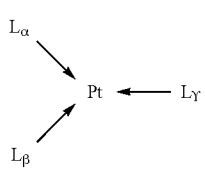

(I)

in which:
$L_\gamma$ presents a carbene of formula (II):

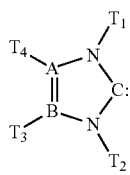

(II)

in which:
A and B independently represent C or N, wherein, when A represents N, $T_4$ does not represent anything and, when B represents N, then $T_3$ does not represent anything;

$T_3$ and $T_4$ independently represent a hydrogen atom; an alkyl group; a cycloalkyl group optionally substituted by alkyl or alkoxy; an aryl group optionally substituted by alkyl or alkoxy; an alkenyl group; an alkynyl group; or an arylalkyl group in which the aryl part is optionally substituted by alkyl or alkoxy; or $T_3$ and $T_4$ form, together and with A and B when the latter each represent a carbon atom, an aryl;

$T_1$ and $T_2$ independently represent an alkyl group; an alkyl group optionally substituted by alkyl; a perfluorinated alkyl group or an alkyl group optionally substituted by a perfluoroalkyl group; a cycloalkyl group optionally substituted by alkyl or alkoxy; an aryl group optionally substituted by alkyl or alkoxy; an alkenyl group; an alkynyl group; or an arylalkyl group in which the aryl part is optionally substituted by alkyl or alkoxy; or $T_1$ and $T_2$ independently represent a monovalent radical of following formula (V):

$$V_1-V_2 \quad (V)$$

in which:
$V_1$ is a divalent hydrocarbon radical,
$V_2$ is a monovalent radical chosen from the group of the following substituents:
alkoxy, $-OR°$ with $R°$ corresponding to alkyl or aryl,
amine, $N(R°)_2$ with $R°$ corresponding to hydrogen, alkyl or aryl, $T_1$ and $T_2$ independently represent a monovalent radical of following formula (W):

$$W_1-\omega-W_2 \quad (W)$$

in which:
W$_1$ is a divalent hydrocarbon radical,
ω represents:
—R$^1$C=CR$^1$—
with R$^1$ corresponding to H or alkyl
or
—C≡C—
W$_2$ is a monovalent radical chosen from the group of the following substituents:
R$^2$=alkyl or H;
Si-alkyl or Si-alkoxy,
ketone,
carboxyl,
amide,
acyl,
or the substituents T$_1$, T$_2$, T$_3$ and T$_4$ form, in pairs, when they are situated on two adjacent ring members in the formula (II), a saturated or unsaturated hydrocarbon chain;
L$_α$ and L$_β$ are ligands which are identical to or different from one another and each represent:

(III.1)

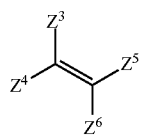
(III.2)

with, in these formulae (III.1) and (III.2):
Z$^1$, Z$^2$, Z$^3$, Z$^4$ Z$^5$ and Z$^6$
each independently representing:
f. hydrogen,
g. a halogen,
h. a cyano,
i. a saturated or unsaturated electron-withdrawing hydrocarbon group,
j. it being possible for two vicinal Z$^1$ to Z$^6$ together to form an electron-withdrawing ring different from the carbene L$_γ$ of formula (II) and optionally comprising heteroatoms (preferably O, N or S);
or the substituents Z$^1$ and Z$^2$ together form, in (III.1), a monovalent alkenyl radical comprising at least one electron-withdrawing residue;
or Z$^3$ to Z$^6$ form, in pairs, in (III.2), a monovalent alkenyl radical comprising at least one electron-withdrawing residue;
or together form the ligand L$_δ$ of formula (IV):

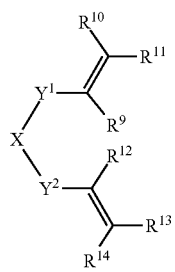
(IV)

in which:
Y$^1$ and Y$^2$ represent, independently of one another, CR$_a$R$_b$ or SiR$_c$R$_d$; X represents O, NR$_e$ or CR$_f$R$_g$;
R$^{10}$, R$^{11}$, R$^{13}$ and R$^{14}$, which are identical or different, are chosen from a hydrogen atom, an alkyl group or an aryl group optionally substituted by alkyl;
R$^9$, R$^{12}$, R$_a$, R$_b$ and R$_e$ are chosen independently from a hydrogen atom; an alkyl group; an acyl group; an aryl group optionally substituted by alkyl; a cycloalkyl group optionally substituted by alkyl; and an arylalkyl group in which the aryl part is optionally substituted by alkyl;
R$_c$ and R$_d$ are chosen independently from alkyl; aryl optionally substituted by alkyl; cycloalkyl optionally substituted by alkyl; and arylalkyl in which the aryl part is optionally substituted by alkyl; or else when Y$^1$ and Y$^2$ independently represent SiR$_c$R$_d$, two R$_c$ groups bonded to two separate silicon atoms together form a chain of formula:

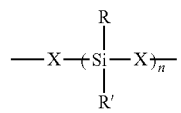

in which n is an integer from 1 to 5; X is as defined above; R and R', which are identical or different, take any one of the meanings given above for R$_c$ or R$_d$;
or
when Y$^1$ and Y$^2$ independently represent SiR$_c$R$_d$, two R$_c$ groups bonded to separate silicon atoms together form a saturated hydrocarbon chain, the two R$_c$ groups, together with said silicon atoms and X, forming a 6- to 10-membered ring;
or when Y$^1$ and Y$^2$ independently represent CR$_a$R$_b$, two R$_a$ groups bonded to separate carbon atoms together form a saturated hydrocarbon chain, the two R$_a$ groups, together with the carbon atoms which carry them and X, forming a 6- to 10-membered ring;
and R$_f$ and R$_g$ represent, independently of one another, a hydrogen atom; an alkyl group; an acyl group; an aryl group optionally substituted by alkyl; a cycloalkyl group optionally substituted by alkyl; an arylalkyl group in which the aryl part is optionally substituted by alkyl; a halogen atom; an alkenyl group; an alkynyl group; or an SiG$_1$G$_2$G$_3$ group where G$_1$, G$_2$ and G$_3$ are, independently of one another, alkyl; alkoxy; aryl optionally substituted by alkyl or alkoxy; or arylalkyl in which the aryl part is optionally substituted by alkyl or alkoxy;
b) a combination of a) with at least one other platinum complex selected from the complexes: platinum in the zero oxidation state, platinum in the +2 oxidation state or platinum in the +4 oxidation state,
and further comprising a curable polyorganosiloxane composition C, catalyst and optionally one or more compound(s) of reinforcing or semireinforcing or bulking fillers or fillers used to adjust rheology of the curable compositions, the composition comprising
(a'') 100 parts by weight of at least one polydiorganosiloxane gum which is a linear homopolymer or copolymer exhibiting, per molecule, at least 2 vinyl groups bonded to different silicon atoms situated in a chain and/or at chain ends, other organic radicals of which bonded to silicon atoms are selected from the group consisting of methyl, ethyl and phenyl radicals, at least 60 mol % of these other radicals being methyl radicals, and said gum exhibiting a viscosity of at least 300 000 mPa·s at 25° C.;

(b") 0.1 to 7 parts by weight of an organic peroxide; and (c") 0.5 to 120 parts by weight of siliceous filler(s) per 100 parts by weight of gum (a").

2. The composition as claimed in claim 1, wherein in the carbene ligands of formula (II):

$T_3$ and $T_4$ represent a hydrogen atom or together form a phenyl, and/or $T_1$ and $T_2$, which are identical or different, represent ($C_1$-$C_8$)alkyl or ($C_3$-$C_8$)cycloalkyl or allyl (—$CH_2$—CH=$CH_2$) or methallyl (—$CH_2$—$C(CH_3)$=$CH_2$) or propargyl (—$(CH_2)_2$—C≡CH),

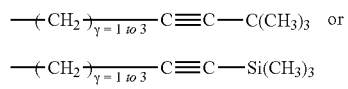

—$(CH_2)_{\gamma=1\ to\ 4}$-amine or —$(CH_2)_{\gamma=1\ to\ 4}$-alkoxy;

and/or A and B both represent a carbon atom.

3. The composition as claimed in claim 1, wherein, in the formulae (III.1) and (III.2), the electron-withdrawing residues are selected from the group consisting of:

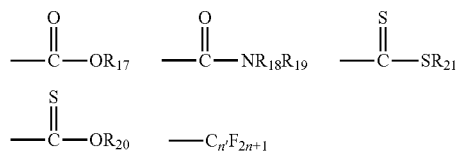

in which: $R_{17}$, $R_{18}$, $R_{19}$ or $R_{20}$ is an alkyl, an alkenyl, an alkynyl or a trialkylsilyl which may or may not be substituted, and n' is between 1 and 50.

4. The composition as claimed in claim 1, wherein $L_\alpha$ and $L_\beta$ together form a ligand $L_\delta$ of formula (IV) in which $Y^1$ and $Y^2$ represent either both $CR_aR_b$ or both $SiR_cR_d$, so that said complexes are either of formula (IV.1) or of formula (IV.2):

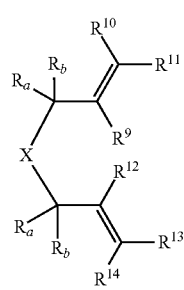

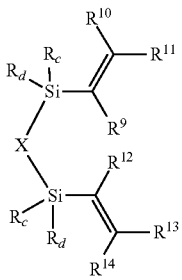

where:

the two $R_a$ groups, the two $R_b$ groups, the two $R_c$ groups and the two $R_d$ groups are identical to one another, and $R^9$=$R^{12}$; $R^{10}$=$R^{14}$; and $R^{11}$=$R^{13}$.

5. The composition as claimed in claim 1, wherein the platinum complexes (a) are metal complexes of following formula (I.1):

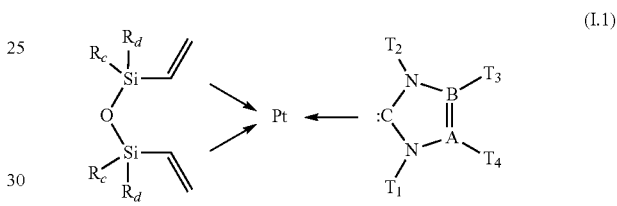

in which:

$T_1$ and $T_2$ are identical and are as defined above;

$T_3$ and $T_4$ are as defined above;

$R_c$ and $R_d$ are as defined above.

6. The composition as claimed in claim 1, wherein b) is a combination of a) with another platinum complex selected from:

hexachloroplatinic acid $H_2PtCl_6$ and its derivatives;

complexes of formula $(PtCl_2.olefin)_2$, the olefin of the complex representing in particular ethylene, propylene, butylene, cyclohexene or styrene; and complexes of platinum and of vinylated organopolysiloxanes.

7. The composition as claimed in claim 1, wherein the amount of specific platinum compound(s), expressed in parts by weight of elemental platinum with respect to the total weight of the polyorganosiloxane constituent(s) of the curable compositions C, is in the range extending from 1 to 250 ppm.

8. The composition as claimed in claim 1, wherein the polyorganosiloxane composition C is composed of siloxyl units of general formula:

and/or of siloxyl units of formula:

in which formulae the various symbols have the following meanings:

the R symbols, which are identical or different, each represent a group of nonhydrolyzable hydrocarbon nature, it being possible for this radical to be:
an alkyl or haloalkyl radical having from 1 to 5 carbon atoms and comprising from 1 to 6 chlorine and/or fluorine atoms,
cycloalkyl and halocycloalkyl radicals having from 3 to 8 carbon atoms and comprising from 1 to 4 chlorine and/or fluorine atoms,
aryl, alkylaryl and haloaryl radicals having from 6 to 8 carbon atoms and comprising from 1 to 4 chlorine and/or fluorine atoms,
cyanoalkyl radicals having from 3 to 4 carbon atoms;
the Z symbols each represent a hydrogen atom or a $C_2$-$C_6$ alkenyl group;
n=an integer equal to 0, 1, 2 or 3;
x=an integer equal to 0, 1, 2 or 3;
y=an integer equal to 0, 1 or 2; the sum x+y lies in the range extending from 1 to 3.

9. The composition as claimed in claim 1 comprising:
(a) 100 parts by weight of at least one polydiorganosiloxane selected from the group consisting of linear homopolymers and copolymers exhibiting, per molecule, at least 2 vinyl groups bonded to different silicon atoms situated in a chain and/or at chain ends, other organic radicals of which bonded to silicon atoms are chosen from the methyl, ethyl and phenyl radicals, at least 60 mol % of these other radicals being methyl radicals, and exhibiting a mean viscosity ranging from 200 to 5000 mPa·s at 25° C.;
(b) at least one polyorganohydrosiloxane selected from the group consisting of linear or cyclic homopolymers and copolymers exhibiting, per molecule, on average at least 2 hydrogen atoms bonded to different silicon atoms, organic radicals of which bonded to silicon atoms are selected from the group consisting of methyl, ethyl and phenyl radicals, at least 60 mol % of these radicals being methyl radicals, and exhibiting a viscosity ranging from 5 to 1000 mPa·s at 25° C., in amounts such that the molar ratio of hydride functional groups of (b) to vinyl groups of (a) is between 1.0 and 10;
(c) a catalytically effective amount of a platinum catalyst; and
(d) 0 to 120 part(s) by weight of siliceous filler(s) per 100 parts by weight of the combination of the polyorganosiloxanes (a)+(b).

10. The composition as claimed in claim 9, the viscosity of the vinylated polydiorganosiloxane reactant (a) is greater than 1000 mPa·s.

11. The composition as claimed in claim 1 comprising:
(a') 100 parts by weight of at least one polydiorganosiloxane gum which is a linear homopolymer or copolymer exhibiting, per molecule, at least 2 vinyl groups bonded to different silicon atoms situated in a chain and/or at chain ends, the other organic radicals of which bonded to silicon atoms are selected from the group consisting of methyl, ethyl and phenyl radicals, at least 60 mol % of these other radicals being methyl radicals, and said gum exhibiting a viscosity of greater than 300 000 mPa·s at 25° C.;
(b') at least one polyorganohydrosiloxane from selected from the group consisting of linear, cyclic and network homopolymers or copolymers exhibiting, per molecule, at least 3 hydrogen atoms bonded to different silicon atoms, organic radicals of which bonded to silicon atoms are the selected from the group consisting of methyl, ethyl and phenyl radicals, at least 60 mol % of these radicals being methyl radicals, and exhibiting a viscosity ranging from 5 to 1000 mPa·s at 25° C., in amounts such that the molar ratio of hydride functional groups of (b') to vinyl groups of (a') is between 0.4 and 10;
(c') a catalytically effective amount of a platinum catalyst; and
(d') 0.5 to 120 part(s) by weight of siliceous filler(s) per 100 parts by weight of the combination of the polyorganosiloxanes (a')+(b').

12. The composition as claimed in claim 9, further comprising one or more auxiliary additive(s) (e), such as: at least one antistructuring product (e1); and/or at least one polysiloxane resin (e2); and/or at least one agent based on a metal oxide or hydroxide or salt (e3); and/or at least one pigment (e4) for manufacturing colored articles; and/or at least one boron-based compound (e5); and/or at least one filler (e6) of flux type and/or of lamellar type which may or may not be used in combination with one or more inorganic entity(ies) in order to give rise, in the case of a fire, to the formation of an insulating ashy substance; and/or at least one adhesion promoter (e7); and/or at least one crosslinking retarder (e8) which crosslink by polyaddition reactions.

13. An article made of silicone elastomer comprising the composition as claimed in claim 1.

14. The article as claimed in claim 13, wherein the article comprises:
primary jackets or insulations used in forming fire-resistant electrical wires or cables,
electrical insulation materials, medium-voltage and high-voltage insulators, cable termination accessories, cable joints, anode caps for television tubes and molded objects or extruded articles for the aeronautics industry.

* * * * *